March 10, 1942.    G. E. FORD    2,276,178
MEAT THERMOMETER
Filed April 21, 1939

INVENTOR
GEORGE E. FORD
BY
ATTORNEY

Patented Mar. 10, 1942

2,276,178

UNITED STATES PATENT OFFICE 2,276,178

MEAT THERMOMETER

George E. Ford, Rochester, N. Y., assignor to Rochester Manufacturing Co. Incorporated, Rochester, N. Y., a corporation of New York Application April 21, 1939, Serial No. 269,191

3 Claims. (Cl. 73—352)

This invention relates to thermometers for culinary use and more especially for use in roasting meats to indicate when the roast is done and one of the objects of the invention is to provide a bi-metallic thermometer with a spacing chamber between its dial housing and the thermometer tube to facilitate the handling of the thermometer when inserting or withdrawing the thermometer from the meat.

Another object of this invention is to have a portion of the wall of the spacing chamber, which forms part of the dial housing, form a continuation of the thermometer tube so that this portion of the wall is brought into contact with the roast on the insertion of the thermometer thereinto in order to provide a heat exchange between the dial housing and the roast that will keep the higher temperature of the dial housing, due to its exposure to the oven heat, from reaching the bi-metallic element so that it cannot influence the operation of this element by the temperature of the inside of the roast.

Still another object of this invention is to provide a meat thermometer with gauge means in order to insure uniform insertion of the thermometer into the meat.

These and other objects and attendant advantages of the invention will become more readily apparent from the detailed description thereof which follows, reference being had to the accompanying drawing in which—

Figure 1:
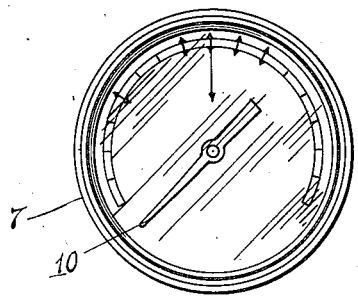
Figure 1 is a top plan view of my thermometer.

In the roasting process the temperature of meat is raised to between 140 and 200 degrees Fahrenheit and to bring this about an oven temperature between 300 and 500 degrees Fahrenheit is used. The exposed portion of a thermometer used for indicating the temperature of meat during the roasting process is therefore subjected to and raised to the higher oven heat and in order that this may not affect the proper operation of the thermo-responsive element it is essential that the temperature of the exposed portion of the thermometer is not conducted to the meat embedded portion of the thermometer and the thermo-responsive element provided therein. This is accomplished in the construction of my present invention in which the thermo-responsive element used is in the form of a helical bi-metallic coil 1 which is surrounded by the thermometer tube 2 and is secured at one end to the pointed plug 3 which closes the bottom of the thermometer tube and forms a pointed extension thereof to provide for the ready insertion of the thermometer tube into the roast. The other end of the bi-metallic coil is secured to the pointer stem 4. The latter is journaled in the sleeve 5 which is telescopingly mounted in the top of the thermometer tube 2 and supports the enlarged casing 6 on the thermometer tube.

The casing 6 is divided into a dial housing 7 and a spacing chamber 8 of which the sleeve 5 is an integral part, being located at the bottom thereof. The dial housing is cylindrical and carries a dial 9 with the pointer stem 4 projecting therethru and the pointer 10 carried by the pointer stem so as to move over the dial.

The spacing chamber below the dial housing has a conical wall and is reduced so that the dial housing overhangs the spacing chamber. A stepped shoulder 11 and an inwardly curved downward extension 12 in the conical wall near the bottom further reduces the spacing chamber to a second shoulder 13 to have the top of the thermometer tube 2 abut thereagainst and seal the joint between the thermometer tube and the casing 6.

Figure 2:
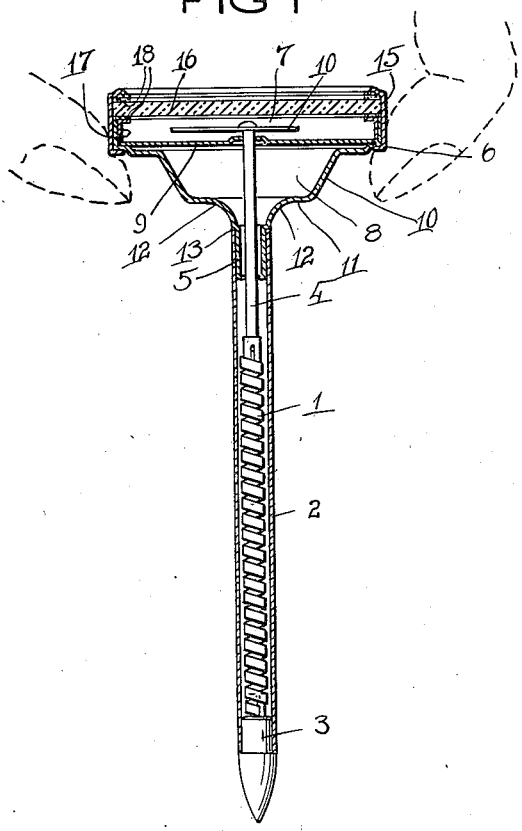
Figure 2 is a vertical sectional view thereof.

As above pointed out and as illustrated in Figure 2 the extension 12 of the wall of the spacing chamber below the shoulder 11 curves inwardly and gradually reduces its diameter to that of the thermometer tube. In this way the lower portion of the spacing chamber provides an extension of the thermometer tube which terminates at the shoulder 11. When, therefore, the thermometer tube is inserted into the roast, this extension will enter with it up to the shoulder 11 and thus not only have the thermometer tube in its entirety but also a portion of the wall of the housing 6 in intimate contact with the meat. The insertion of the thermometer into the meat to the shoulder 11 furthermore provides an always predetermined and uniform contact between the thermometer and the meat.

In the use of the thermometer the dial housing and the exposed portion of the spacing chamber thereof are constantly exposed to the high oven heat during the roasting of the meat and their walls are therefore at all times at a higher temperature than the wall of the thermometer tube which is embedded in the meat. However, the contact of the bottom portion of the housing with the meat, as provided by my invention, will cause the higher temperature of the dial housing to be transferred to the meat at the point of contact therewith so that this higher temperature of the housing will not be conducted to the thermometer tube but will be dissipated in the meat. In this way only the temperature of the inside of the meat is transmitted to the thermometer tube to effect the operation of the bimetallic element located within it. This gives this thermometer a greater accuracy in its indication than has heretofore been possible with this type of thermometer.

The spacing chamber spaces the overhanging dial housing from the surface of the roast when the thermometer is inserted up to the shoulder 11. The fingers of the hand may thus engage under the dial housing to firmly grip it without having the fingers come in contact with the surface of the roast. This provides for a quick, easy and uniform insertion into or withdrawal of the thermometer from the roast.

A bezel 15, which is telescoped over the outside of the dial housing, holds the crystal 16 against the top of the casing and the spacing ring 17, and seals the top of the casing by means of the gaskets 18, 18, one on top and the other below the edge of the crystal.

I claim:

1. In a thermometer adapted for insertion into a roast or other object, the combination of a tube of substantially uniform diameter thruout its length with a closed pointed end at the bottom thereof, a thermo-responsive member within said tube, a dial housing, a tubular extension of increasing diameter projecting from said tube and connecting the top of said tube with the bottom of said housing, stop means on said extension for limiting the insertion of the extension with said tube and providing heat exchange contact with the outer surface of the roast or other object, and indicating means in said dial housing operatively connected with said thermo-responsive member thru said extension.

2. In a thermometer adapted for insertion into a roast or other object, the combination of a tube of substantially uniform diameter thruout its length with a closed pointed end at the bottom thereof, a thermo-responsive member within said tube, a dial housing, a spacing chamber of decreasing diameter at the bottom of said dial housing connecting said tube with said dial housing so as to have the bottom of said chamber provide a shoulder stop to limit the insertion of said tube and provide heat exchange contact between the bottom of said chamber and the outer surface of the roast or other object, and indicating means in said dial housing operatively connected with said thermo-responsive member thru said spacing chamber.

3. In a thermometer adapted for insertion into a roast or other object, the combination of a tube of substantially uniform diameter thruout its length with a closed pointed end at the bottom thereof, a thermo-responsive member within said tube, a dial housing, a spacing chamber at the bottom of said housing, a tubular extension projecting from the bottom of said spacing chamber for telescopic connection with the top of said tube, the bottom of said spacing chamber providing stop means for limiting the insertion of said tube and providing heat exchange contact with the surface of the roast or other object, indicating means in said dial housing, a dial shaft connecting said thermo-responsive member with said indicating means, and a bearing for said dial shaft within said tube spaced from the bottom of said spacing chamber.

GEORGE E. FORD.